Fig. 6

Fig_7

Aug. 13, 1946.  E. R. BONNEFOY-CUDRAZ  2,405,557
APPARATUS FOR MANUFACTURING HOLLOW GLASS ARTICLES
Filed Jan. 24, 1941   11 Sheets-Sheet 8

Fig. 8

Inventor
EMILE, ROBERT BONNEFOY-CUDRAZ

Attorneys

Aug. 13, 1946. E. R. BONNEFOY-CUDRAZ 2,405,557
APPARATUS FOR MANUFACTURING HOLLOW GLASS ARTICLES
Filed Jan. 24, 1941 11 Sheets-Sheet 10

Inventor
EMILE, ROBERT BONNEFOY-CUDRAZ

Attorneys

UNITED STATES PATENT OFFICE 2,405,557

APPARATUS FOR MANUFACTURING HOLLOW GLASS ARTICLES

Emile Robert Bonnefoy-Cudraz, Courbevoie, France; vested in the Alien Property Custodian Application January 24, 1941, Serial No. 375,868
In France January 9, 1940

10 Claims. (Cl. 49—5)

The invention relates to apparatus for the manufacture of hollow glass articles, containers and the like and is especially adaptable for the manufacture of thin-walled articles such as blown tumblers and electric lamp bulbs.

In the commercial production of many hollow articles or containers, it is the common practice to utilize glass feeders and glass-forming or shaping machines each automatically actuated and operated in timed relation so that individual charges of glass are delivered from the feeder to the forming machine in a predetermined cycle.

Each glass feeder includes a mechanical shearing device which severs a charge of glass from the mass issuing from the forehearth of the furnace following which the severed charge is delivered to the shaping machine. In this severing operation each end of the charge is chilled by the contact of the shears with the result that during the article forming operations by the forming machine, it is difficult and in some cases impossible to eliminate the chilled portion of the glass or "shear mark" from the finished article. The appearance of this shear mark in the chilled article is due to the fact that the charge is so delivered and handled by the forming machine that at least one severed end and in many cases both severed ends are incorporated into the finished article, no attempt being made to eliminate these portions during the fabricating operation.

In the production of thin-walled articles such as blown tumblers or electric lamp bulbs, shear marks or unduly chilled portions of a charge of glass may produce serious defects in the finished article which may seriously affect their mechanical and thermal endurance and the high optical values necessary in electric lamp bulbs.

A primary object of the invention is to fashion or form the desired article in such a manner that unduly chilled portions of glass occasioned during the feeding or forming operations do not enter into the completed article but are cast aside as waste glass.

Another object of the invention is to produce the completed article from interior portions of a mass of glass delivered from the furnace or from those portions of a mass of glass which have not been unduly chilled in the feeding or forming operations.

The invention contemplates the use of a suitable forming machine operating in timed relation to a feeder with the result that the molten glass from the furnace is converted or fashioned automatically into the final product. In the embodiment illustrated a feeder of the usual commercial type delivering periodically a charge of glass of suitable size may be utilized and this charge is delivered in a substantially horizontal plane to the receiving support or plate of a rotary forming machine provided with a plurality of blowing molds and blowing heads co-operating therewith. The charge of glass upon delivery to the shaping machine is preliminarily worked in the manner hereinafter more fully described and after the glass charge so worked is blown in the finishing mold the severed portions or unduly chilled portions of the charge of glass are cast aside or ejected from the forming machine as waste glass.

The glass-receiving or supporting plate of the forming machine is movably mounted and its operative positions adjusted in such a way as to insure its accurate co-operation with the blowing mold.

After the final blowing of the article has been accomplished provision is made for its automatic withdrawal from the blowing mold and delivery from the forming machine.

Other objects of the invention will appear in the course of the following detailed description, reference being had to the accompanying drawings wherein corresponding parts are designated by corresponding marks of reference.

Referring now to the drawings.

A stationary vertical column or pedestal 1 supports and is surrounded by a cylindrical and rotatable sleeve 5 having an outwardly and downwardly extending portion or crown 125. The sleeve 5 is supported for rotation upon suitable ball bearings carried by the column 1. This sleeve 5 forms the main support for a plurality of radially disposed blow-molds, an equal number of glass-supporting or working tables and an equal number of blowing heads, these parts being brought into the necessary co-operative relation at the proper time and in the manner hereinafter described.

The sleeve 5 is rotated about the vertical axis of the machine by the worm wheel 23 connected to the sleeve 5 by the vertical posts 7. The worm wheel 23 is driven by the worm 3, see Fig. 2, which in turn is connected to a suitable source of power not shown.

Figure 3:
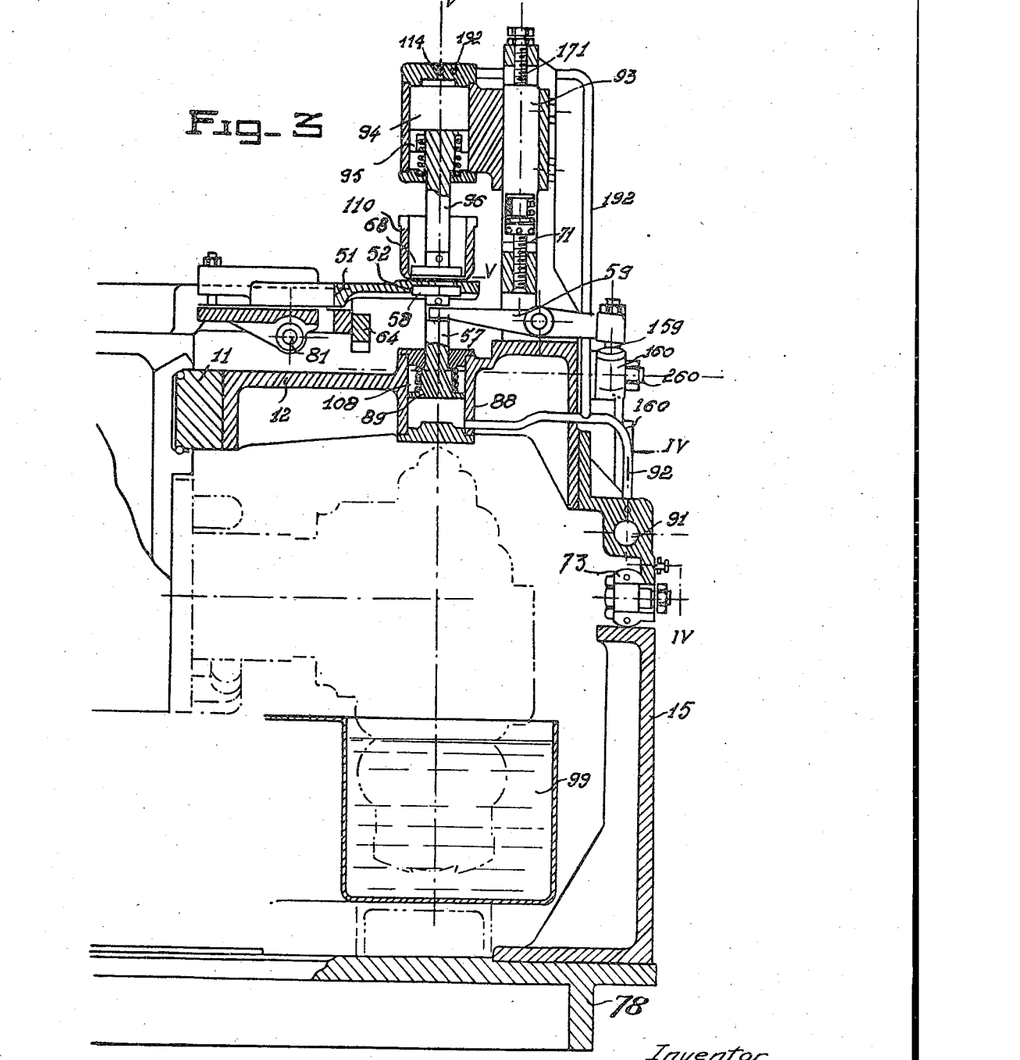
Figure 3 is a vertical sectional view illustrating a portion of the mechanism for preliminarily working the glass charge into a blank suitable for blowing.

A single oscillatory arm 12, Fig. 3, is movably mounted on the crown 125 through the collar 11 and carries the obturating device 58 for the orifice 52 in the work-table 51 and the guiding and flattening or pressing devices for the glass charge. This single arm co-operates with each of the several work-tables and is moved at the proper time so that its parts are brought into co-operative relation with a work-table and its orifice and after completing its functions is moved away to a position where it will later cooperate with the next succeeding work-table and so on.

Inasmuch as a single blow-mold, its co-operating work-table and each blowing head constitute in effect a single glass-working unit, a description of one of these units will suffice for all.

Figure 1:
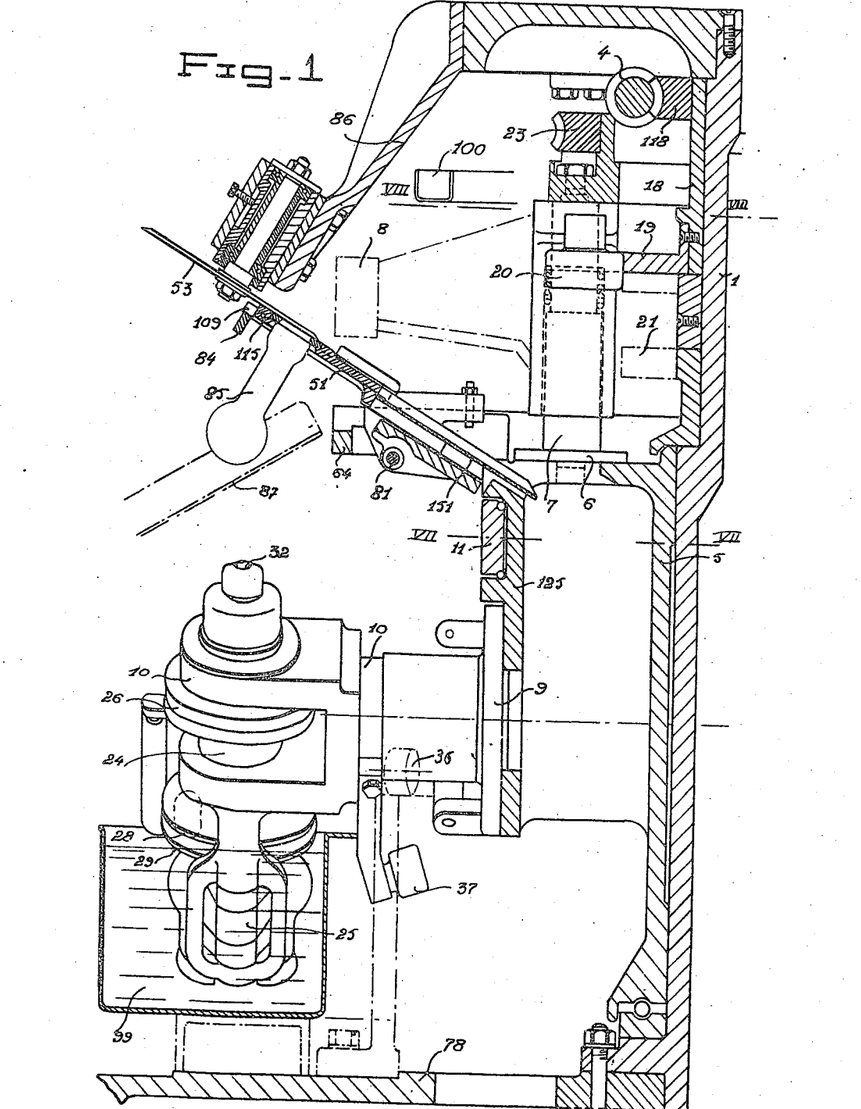
Figure 1 is a vertical section partly in elevation showing the glass-supporting plate or worktable in position to deliver the finished article from the forming machine and the blowing mold in inverted position in the cooling bath.
Figure 2:
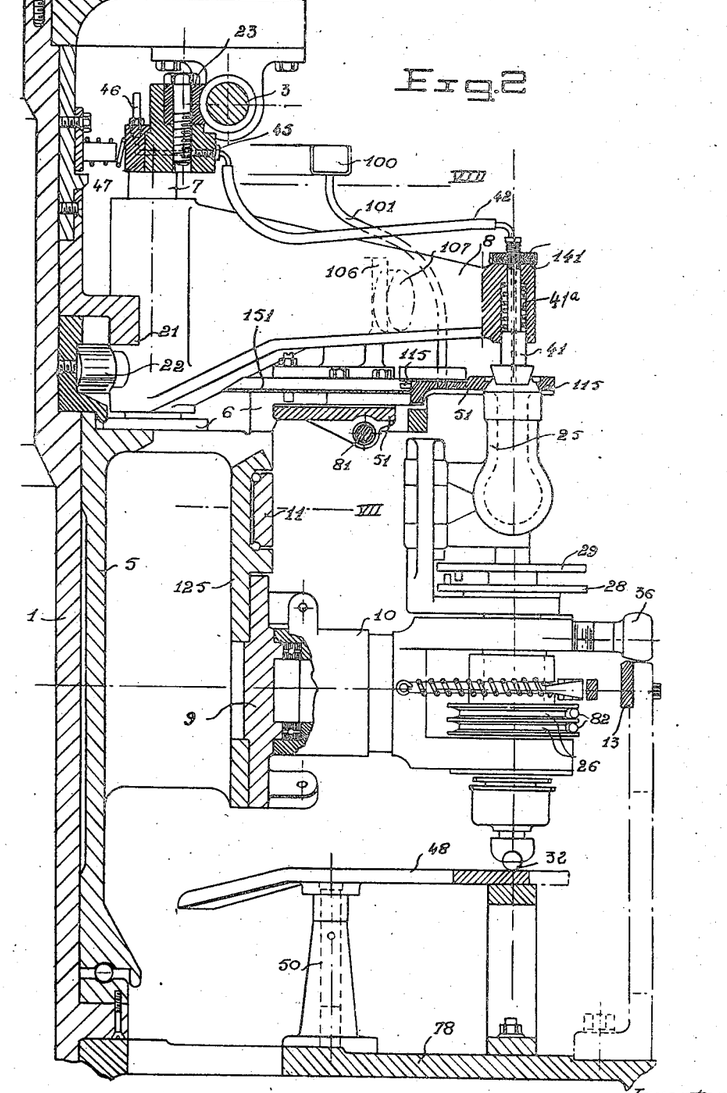
Figure 2 is a vertical section showing the position occupied by the several co-operating parts during the blowing operation. This view is in a direction opposite to that of Figure 1.

As shown in Figs. 1 and 2, the outwardly extending or horizontal portion of the sleeve 5 carries the plate 6 to which the work-tables 51 are articulated at 81. Each work-table 51 is provided with an orifice 52 over and through which the glass charge and blank is manipulated and worked as hereinafter described. The plate 6 also carries the vertical posts 7 which support the blowing apparatus 8. The downwardly extending portion of the crown 125 also carries a horizontal shaft 9 about the axis of which the mold-support 10 rotates to position the mold in its upright and inverted positions.

A suitable horizontal frame 78 is fixed to the lower part of the pedestal 1, see Figs. 1 and 2, and supports the cams 13 and 14 which effect the positioning of the mold in upright and inverted position. The frame 78 also supports a vertical segment 15, the upper surface of which is fashioned into a runway for aiding the support of the charge-guiding and blank-flattening device and the obturator 58.

A cylindrical crown 18 is mounted around the upper portion of the column 1 and carries cam tracks 19 and 21 for the rollers 20 and 22 connected to the movable blowing head and its associated mechanism. A worm wheel 118, secured to the crown 18, movable by the worm 4 permits a rotary adjustment of the crown in respect to the pedestal 1, thereby permitting a variation in the time of the operations effected by the cams.

The rotatable support 10 for the mold is mounted on the horizontal shaft 9. It comprises plates 28 and 29 and arms carrying the rollers 36 and 37, see Figure 1, and the ball 32 mounted in axial alinement with the blow-mold and located at the opposite end of the blow-mold mechanism. See Figs. 1 and 2. The rollers 36 and 37 being operated by their respective cams 13 and 14, serve to move the mold to an upright or blowing position and invert the same for cooling in the cooling bath. The roller 32 working in conjunction with the segmental cam 48, serves to open and close the mold halves. Inasmuch as the precise mechanism for so actuating the mold mechanism is not claimed per se in this application, further description will be unnecessary.

Figure 7:
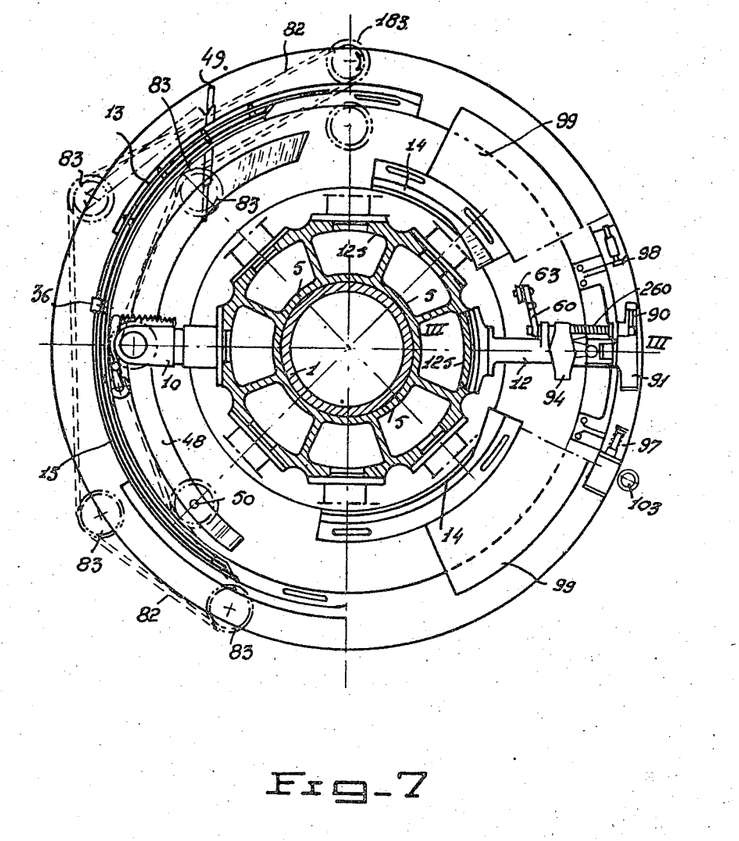
Figure 7 is a horizontal section of the rotary forming machine taken on the line VII—VII of Figure 1.
Figure 8:
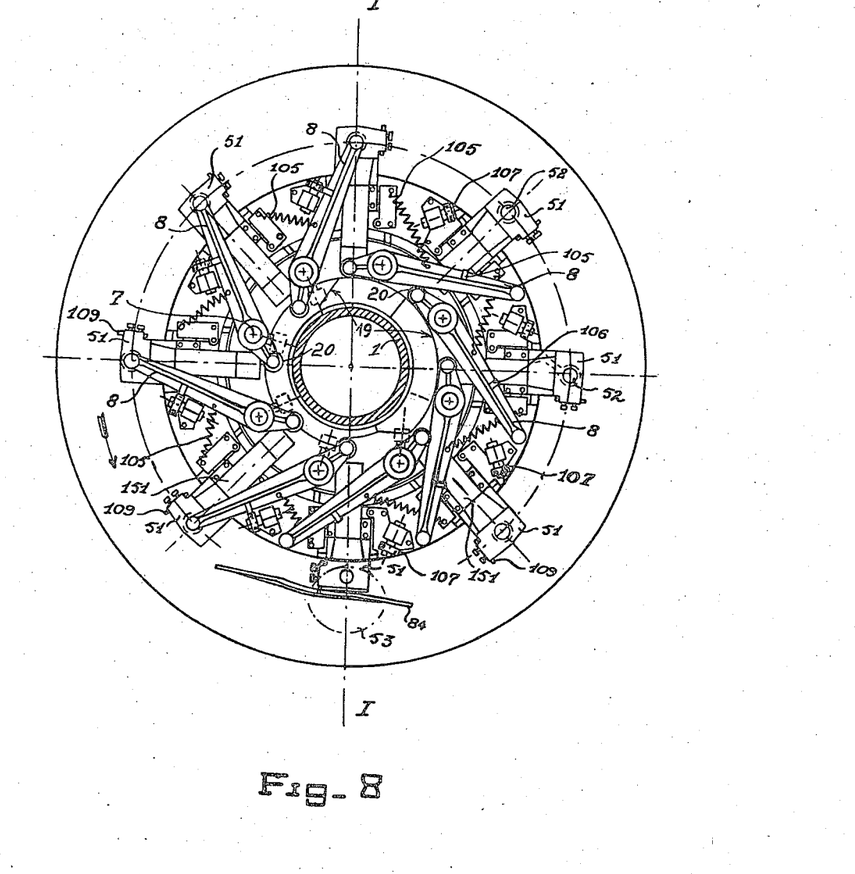
Figure 8 is a horizontal section of the rotary forming machine taken along the line VIII—VIII of Figure 1.

Each mold may be rotated about its axis during the blowing operation to facilitate a smooth finish upon the article by ropes 82 passing over pulleys 26 keyed to the shaft 24 carried by each mold support. A portion of the driving ropes 82 may pass over guide pulleys 83, see Figure 7. The rope 82 is driven by the pulley 183 connected to a source of power not shown. Each blowing mechanism 8 comprises a blow-head 41 which is resiliently mounted and provided with adjusting disks 141, see Fig. 2. The head 41 is longitudinally bored and is connected by a flexible plate 42 to a conduit 45 provided in a notched ring 23 and from which there leads a pipe 46 to a source of compressed air. The blow-head 41 is carried on the outer end of an arm mounted to swing about the shaft 7. The cam roller 20 connected to the blow-head arm, operating in conjunction with the cam 19 produces the swinging movement of the blowing mechanism about the shaft 7. The roller 22 operating in conjunction with the cam 21 causes a lowering of the blowing-head mechanism.

It is preferable that the cam tracks 19 and 21, just referred to be split or made of a plurality of sections adjustable in respect to each other in order to vary the amplitude of the movements of the blow-head mechanism. It is desirable that the blow-head be accurately alined with the orifice in the work-table and the blow-mold, and for this purpose an abutment 107 is carried by the crown 125. This abutment embodies a roller mounted on an eccentric spindle carried in a suitable housing. The blow-head arm 8 carries an adjustable finger 106 adapted to be moved against the abutment 107 and when such parts contact the blowing-head should assume exact vertical alinement with the orifice of the working table and the blowing-mold. If the blow-head does not aline properly an adjustment of the abutment 107 and/or the finger 106 will produce the desired position of the blow-head.

Each work-table is provided with a trough or slab 151 which projects inwardly toward the axis of the machine. Each work-table 51 carries a roller 109 which contacts with the guide 84 to rock or tilt the outer end of the work-table. This movement occurs after the article has been completed by blowing in the blow-mold and is for the purpose of bringing the collar of the bulb or the unused glass surrounding the orifice 52 of the work-table 51 into contact with the cutting wheel 53.

The cutting wheel 53 is axially adjustable and rotatably mounted in the fixed arm 86 connected to the top of the vertical pedestal 1. The several work-tables 51 pass successively beneath the cutting wheel 53. When the collar or unused glass is separated from the finished article, the article falls into the inclined channel or chute 87 and is thereby delivered from the machine. The roller 109 is mounted on an eccentric spindle fashioned for a turning movement in the end of the work-table. By adjusting the eccentric spindle the position of the work-table 51 may be adjusted in respect to the cutting wheel 53.

Figure 4:
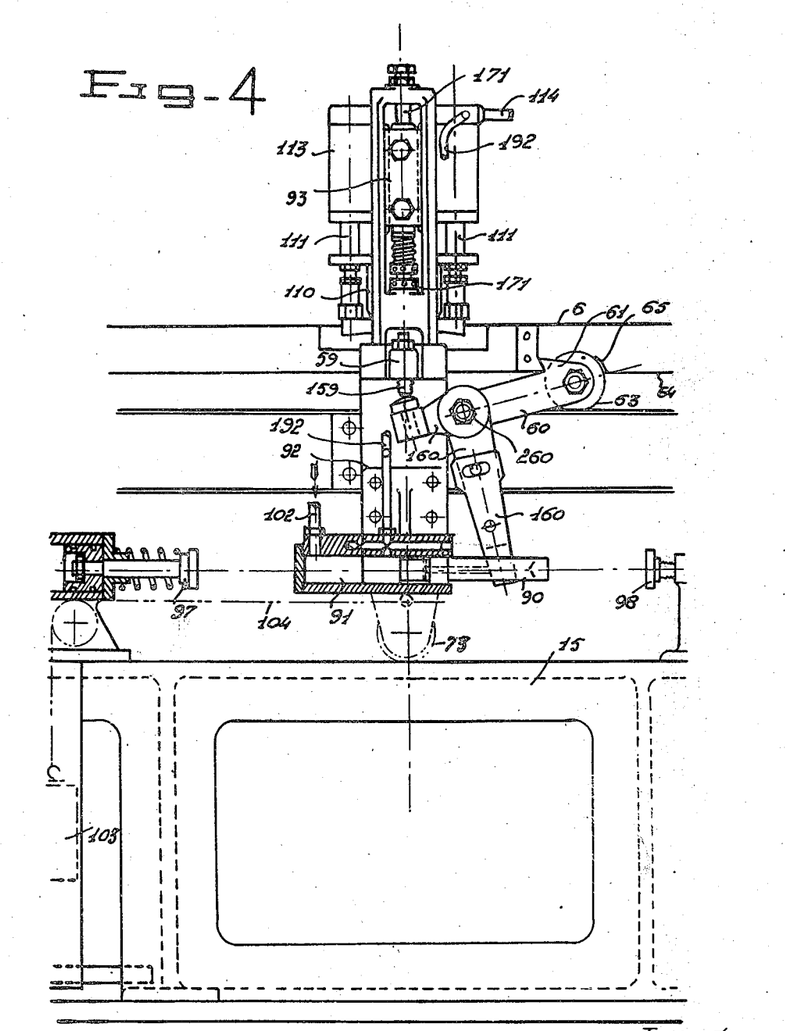
Figure 4 is an elevation of the mechanism shown in Figure 3 looking radially inward of the forming machine.
Figure 5:
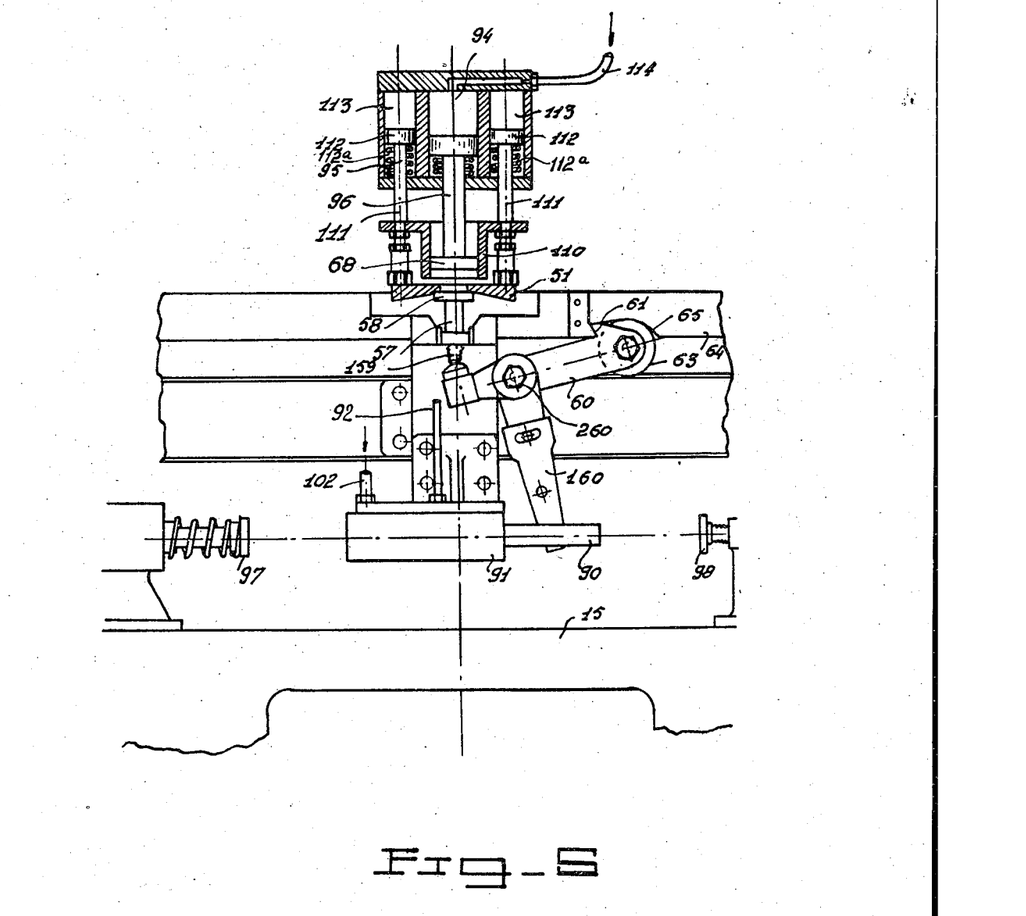
Figure 5 is a view similar to Figure 4 showing the cylinders which co-operate with the supporting plate or work-table in section.
Figure 6:
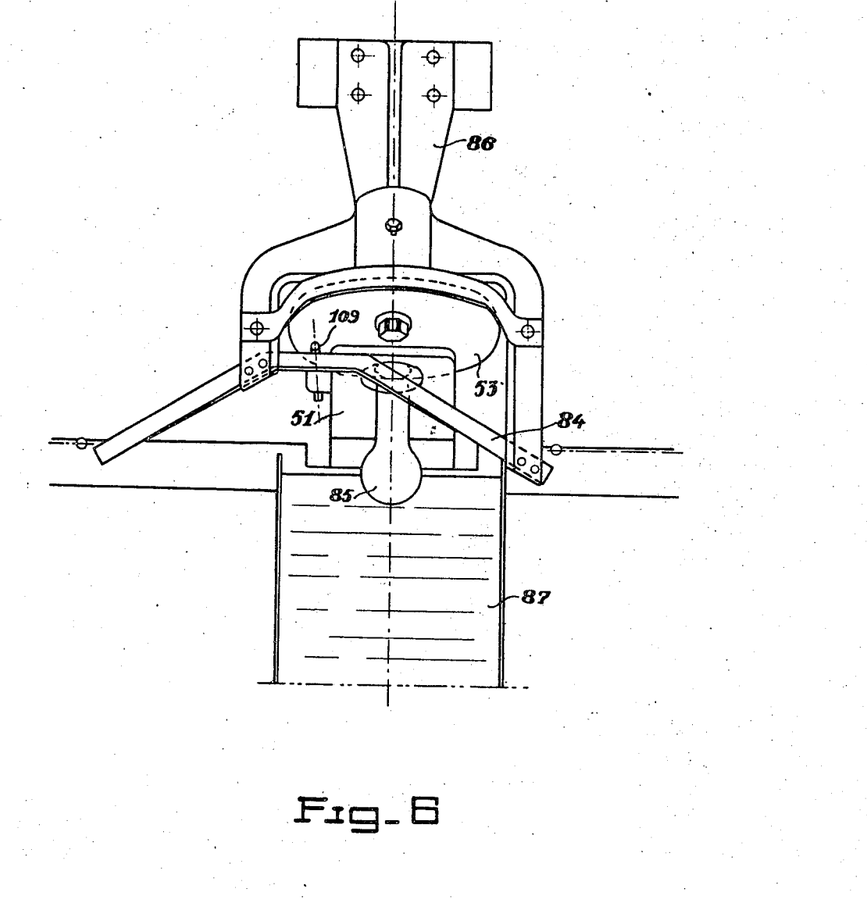
Figure 6 is a detail elevation illustrating the wheel for removing the waste glass and the finished article in position for delivery from the machine. This view is looking radially inward of the machine.

It has been observed that the arm 12 supports the obturator 58 of the orifice 52 and the flattening and guiding mechanism for the glass charges. The obturator 58 is actuated by the mechanism shown in Figs. 3, 4 and 5 and consists of a pneumatic cylinder 88 containing the piston 89 attached to the lower end of the rod 57. The upper end of the rod 57 serves to move the obturator head 58 upwardly at the proper time, the latter being secured to the inner end of a lever 59 pivoted intermediate its ends, as shown in Figure 3. Another lever 60, keyed to a shaft 260, carries a dog or ratchet 61 in contact with the cam 64 formed by the under edge of the plate 6. This cam is provided with notches 65 equal in number to the glass-forming units. The shaft 260 carries a bell crank 160, one leg of which is connected to the rod 90 of a distributor 91. This distributor, through the air-supply pipe 92 controls the upward movement of the piston 89 which in turn, moves the obturator head 58 upwardly. The other or second leg of the bell crank 160 carries an abutment which is adapted to contact with the abutment 159 of the lever 59, see Figs. 3 and 4.

The guiding and thinning and flattening mechanisms for the glass charge are supported by a block 93 resiliently mounted on the arm 12, see Fig. 3. The guiding mechanism of the glass charge includes an inclined chute or conduit g, Figure 12, preferably in the form of a curved segment so as to gradually and rapidly turn the falling charge from a line of vertical to a line of horizontal travel. The lower end of the chute terminates above and to one side of the orifice 52 in the work-table 51. Located above the work-table 51 and axially alined with the orifice 52 is a cup 110, a portion of which is cut away to permit the entry of the glass charge thereinto and over the orifice 51.

The cup 110 is fastened to the rods 111 of two pistons 112 working in the cylinders 113 fixed on the block 93. An air pipe 192, the lower end of which is connected to the air pipe 92, see Figure 3, leads to the upper end of each of the cylinders 113.

The mechanism for flattening or thinning the glass charge and working the same into a glass blank comprises a pneumatic cylinder 94 fastened to the framework 93 between the two cylinders 113, a piston 95 working in the cylinder 94, a flattening or thinning head 68 fastened to the lower end of the piston rod 96 and adjustable abutments 171 which permit a regulation of the height of the block 93 and consequently the extent to which the head 68 will flatten or compress the charge of glass into the orifice 52 and over the surface of the work-table 51. An air-pipe 114 admits air to the upper end of the cylinder 94. An adjustable timer (not shown) is utilized to coordinate the time of admission of air to the pipe 114 with the operation of shears of the glass feeder in such a way that air will be admitted to the pipe 114 at a suitable time following the cutting movement of the shears. Timers for the purpose of coordinating operations in synchronism with shear movements are well known in the art.

The operation is as follows:

An automatic feeder of the usual commercial type (not shown) is utilized to periodically deliver severed charges of glass of uniform weight to the work-tables 51 of the forming machine. The cycles of the feeder and the forming machine are synchronized in such a way that the feeder delivers a charge of glass of definite weight each time the pawl 61 of the arm 60 is engaged to the notch 65 in the table, thus connecting the movable arm 12 with the table and moving it about the central vertical axis of the forming machine. The movement of the arm 12 produces simultaneously the rising of the obturator head 58 to a position where it closes the orifice 52 and a lowering of the cup 110 and its chute g, to a position nearly in contact with the top surface of the work-table 51, see Fig. 12, owing to the operation of the distributor 91 which admits air into the cylinders 88 and 113 through the pipe 192 the latter being connected to a source of compressed air (not shown). The air so admitted thus operates the piston 89 and the pistons 112.

It will be noted that as soon as the glass charge produced by the feeder arrives on the work-table 51 and over the orifice 52 the hereinbefore described distributor (not shown) operates the valve in the pipe line 114 and admits compressed air into the cylinder 94 above the piston 95. This causes the flattening or compressing head 68 to move downwardly toward the glass charge and flatten or press the same into the orifice 52 and upon the obturator 58. It will also be noted that the glass at each end of the charge adjacent the line of severing is forced outwardly between the lower edge of the cup 110 and the top surface of the work-table 151, see Figs. 13 and 14. As soon as this flattening or pressing of the glass is accomplished, the air-distributor relieves the air from above the piston 95 and the piston is moved upwardly under the influence of the spring 95a (Figs. 3 and 5) thereby lifting the pressing and flattening head 68, causing the latter to assume the position shown in Figure 15.

At the same time the rod 90 of the distributor 91 comes in contact with the adjustable abutment 98 which throws back the rod 90, thus cutting off the admission of compressed air to the cylinders 88 and 113 and opening them to the atmosphere. The cylinder 88 being at the exhaust position, permits the obturator head 58 to move downwardly under the action of the spring 108 acting on the piston 89. At the same time the air pressure in the cylinders 113 is relieved permitting the springs 112a to move upwardly carrying with them the rods 111 to which the cup 110 and chute g is attached.

The contact of the rod 90 with the abutment 98 as explained above also rocks the bell crank 160 which causes the pawl 61 to leave or clear the notch 65. This disengages or frees the arm 12 from the table and a counterpoise 103 coupled to the arm by the cable 104 (Fig. 4) carries the arm back into contact with the dampener 97. This movement is aided by the travel of the roller 73 on the cam 15. The arm 12 is brought back to its initial position to co-operate with the next succeeding glass-working unit by the return spring of the dampener 97.

Figures 14, 15, 16, 17, 18, 19:
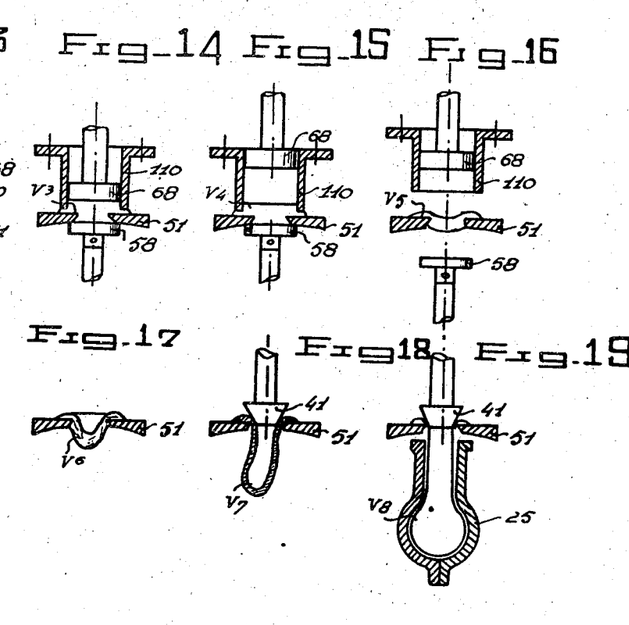

The orifice 52 now being open, the glass blank or mass is free to settle in and flow below the orifice, as shown in Figs. 16 and 17.

Following the settling and elongation of the glass blank, as shown in the latter figure, the blow-head arm 8 moves its blowing-head into alinement with the orifice 52 by the action of the spring 105, abutments 106 and rollers 107. The blow-head is brought into contact with the glass blank under the influence of the spring 41ª, Fig. 2, and seats itself in blowing relation with the blank, as shown in Figure 18.

Figure 9:
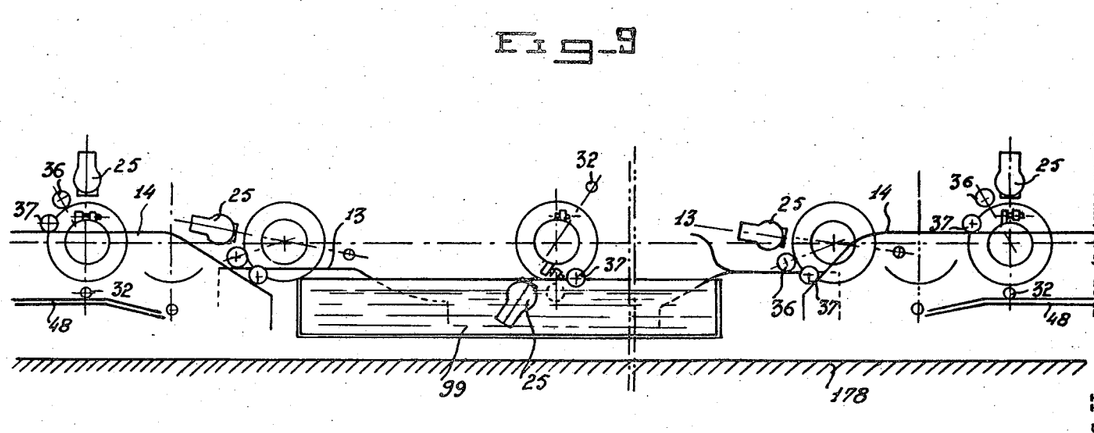
Figure 9 is an evolution of several of the actuating cams and their function.
Figure 10:
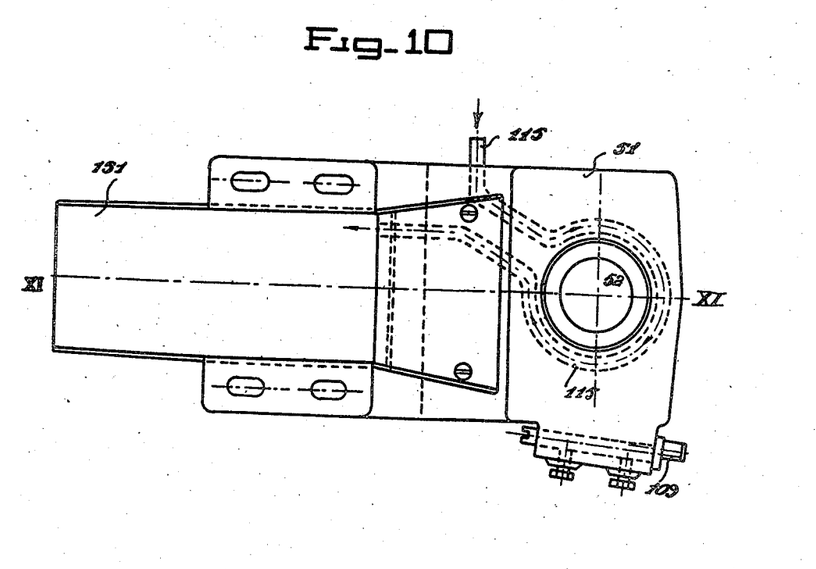
Figure 10 is a detailed plan view of the work-table and associated parts.
Figure 11:
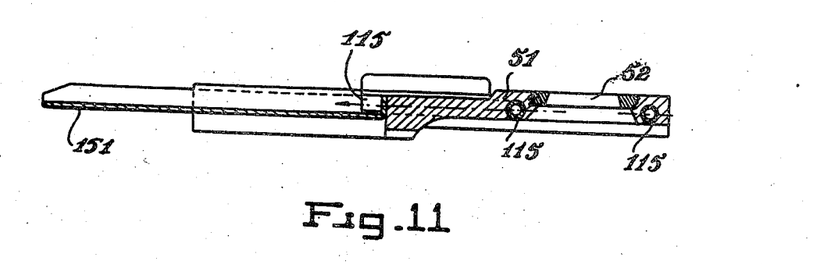
Figure 11 is a section along the line XI—XI of Figure 10.

Figure 9 shows in evolution the plan of the cams 13 and 14 on which the rollers 36 and 37 of the rocking supports of the molds 25 are rolling and the plane of the cam 48 on which the ball 32 is traveling. In this figure there is also shown the water bath 99 into which the molds are dipped for cooling. The opening and closing of the molds are governed by the action of the pawl plates 28 and 29, as known.

Figs. 12 to 20 show diagrammatically the formation of an electric lamp bulb passing through the various stages of fabrication.

Figures 12, 13, 20:
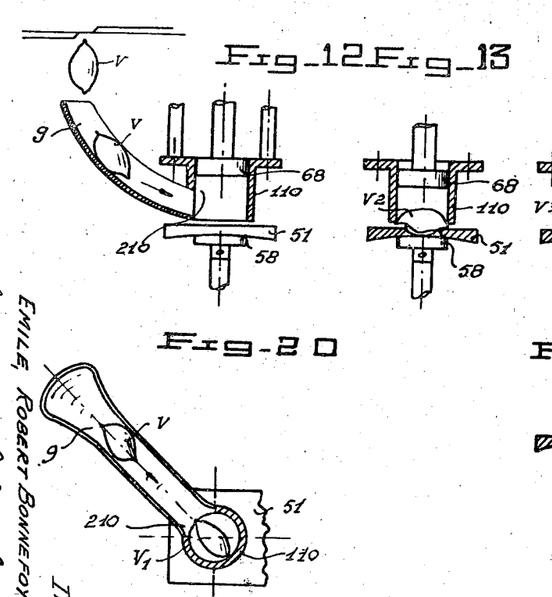
Figures 12 to 19 are diagrammatic views illustrating the delivery of a severed charge to the work-table of the forming machine, the several successive operations of preliminarily working the glass blank and the final blowing operation.
Figure 20 is a diagrammatic plan view of Figure 12.

The glass charge V, dropping from the shears of the automatic feeder falls into the curved chute or guide $g$ and brings it into the cup 110 through the opening 210. The enlarged ends of the chute or guide serve to receive and deliver the charge to the work-table, despite any slight delays in the delivery of the charge by the feeder. Owing to the cup 110 and the curvature of the chute $g$, the glass charge is always delivered to the work-table in such a manner that its two severed ends remain outside of or beyond the orifice of the work-table. In this way the deleterious effects of embodying the severed ends of the glass charge into the blank and finished article are eliminated. The obturator head 58 has closed the bottom of the orifice 52 in the work-table and the glass charge settles into the orifice, as shown in Figure 13. The pressing or flattening head 68 operating within the cup 110 then flattens the glass mass and forces the severed portions of the charge beyond the edges of the orifice 52 and the edge of the cup 110, as shown in Figure 14. Under this action of the head 68 the charge of glass is also forced into the orifice and in contact with the obturator head 58. The pressing head 68 is then raised leaving the glass blank V⁴ on the table 51, Figure 15. The obturator head 58 is then lowered freeing the orifice 52 in the work-table and at the same time the cup 110 rises, Fig. 16. The flattening and obturating heads being removed from the work-table 51, the glass blank V⁶ tends as a result of its own weight to flow through the orifice 52 and elongate, Fig. 17. The blow-head 41 is then brought over and into alinement with the orifice 52 and into blowing engagement with the glass blank, as shown in Figure 18. At this time air is admitted to the interior of the blank sufficient to elongate or lengthen it without increasing its dimensions above that of the blow-mold cavity.

Following this preliminary blowing the blow-mold rises and closes about the glass blank or parison V⁷, whereupon it is blown to final form in the mold, Figure 19. Following the completion of the article in the blow-mold, the latter is opened and inverted into the cooling bath. The work-table 51 carrying the completed bulb, is raised to the inclined position, as shown in Figure 1, by the cam 84 where the surplus or discarded glass resting on the top surface of the table is brought in contact with the revolving knife 53, rotatably mounted on the stationary arm 86. Due to the travel of the work-table in respect to the knife, a severing or removal of the surplus glass from the completed article is accomplished and results in a releasing of the finished article onto the chute or guide 87 by which it is carried away from the machine. The surplus or discarded glass will slide inwardly along the work-table and across the slab 151 by which it is guided away from the working parts of the machine and as shown, may fall between the sleeve 5 and crown 125.

Water or other fluid used for cooling the work-tables and flowing in the conduits 115, may be caused to flow across the slab and thence from the machine in the same manner as the discarded glass.

What is claimed is:

1. In an apparatus for the manufacture of hollow articles by blowing and molding from separate masses of plastic glass delivered on perforated work-tables, a movable series of tilting work-tables, actuating means for the said series of tables, a knife in fixed position on an inclined plane, and fixed means near the said knife to bring by rocking the top of the tables in the plane of the knife.

2. In an apparatus for the manufacture of hollow articles by blowing and molding from separate masses of plastic glass delivered to work-tables, the combination with a plurality of horizontal work-tables each having an orifice and means for supporting the work-tables for common movement around a common axis, of a member for receiving and centering glass masses which are fed to the tables in a substantially horizontal direction, of means for connecting said member with one of the work-tables, of means for moving said member in axial alinement with the orifice of said table, of means for interrupting the connection between the member and the work-table, and an obturator bound to the centering member on the same axis as said centering member, and movable on said axis under the work-tables.

3. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a freely falling charge of glass from a vertical to a horizontal direction of travel onto the work table and through said opening into the cup to a position over the orifice with the ends of the charge overlying the orifice, and pressing means movable within the cup to force the ends of the glass charge outwardly between the lower edge of the cup and the work table.

4. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a freely falling charge of glass from a vertical to a horizontal direction of travel onto the work table and through said opening into the cup to a position over the orifice with the ends of the charge overlying the orifice.

5. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a freely falling charge of glass from a vertical to a horizontal direction of travel onto the work table and through said opening into the cup to a position over the orifice with the ends of the charge overlying the orifice, and means for moving said cup toward and away from the work table.

6. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a freely falling charge of glass from a vertical to a horizontal direction of travel onto the work table and through said opening into the cup to a position over the orifice with the ends of the charge overlying the orifice, a movable closure for the bottom of the orifice and pressing means movable within the cup above the glass therein to force the glass downwardly into the orifice and in contact with the closure when the latter closes said orifice.

7. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a free falling charge of glass from a vertical to a horizontal direction of travel onto the work table and through said opening into the cup to a position over the orifice with the ends of the charge overlying the orifice, a movable closure for the bottom of the orifice and pressing means movable within the cup above the glass therein to force the glass downwardly into the orifice and in contact with the closure when the latter closes said orifice, and the ends of the glass charge outwardly between the lower edge of the cup and the work table.

8. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a freely falling charge of glass from a vertical to a horizontal direction of travel onto the work table and through said opening into the cup to a position over the orifice with the ends of the charge overlying the orifice, a closure for the bottom of the orifice, and means for moving the closure and the cup toward and away from the orifice.

9. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a freely falling charge of glass from a vertical to a horizontal direction of travel onto the work table and through said opening into the cup to a position over the orifice with the ends of the charge overlying the orifice, a closure for the bottom of the orifice, means for moving the closure and the cup toward and away from the orifice, and a blowhead adapted at times to cooperate with the orifice to expand the glass below the orifice.

10. In combination with a glass feeding mechanism having a downwardly directed discharge opening, a horizontal work table provided with an orifice, a bottomless cup having a side wall and located over the table in alignment with the orifice, said wall being provided with an opening and said cup defining a glass receiving cavity of greater diameter than the orifice and projecting downwardly to a position spaced from the work table, a delivery chute operatively associated with the discharge opening and the cup opening to divert a freely falling charge of glass from a vertical to a horizontal direction of travel onto the work table and through said opening into the cup to a position over the orifice with the ends of the charge overlying the orifice, a closure for the bottom of the orifice, means for moving the closure and cup toward and away from the orifice, a sectional blow mold and means for opening and closing the same, means for moving said mold into and out of axial alignment with said orifice and a blowhead adapted at times to cooperate with the orifice to expand the glass below the orifice and in the blow mold when the latter is closed.

EMILE ROBERT BONNEFOY-CUDRAZ.